United States Patent Office 3,791,937
Patented Feb. 12, 1974

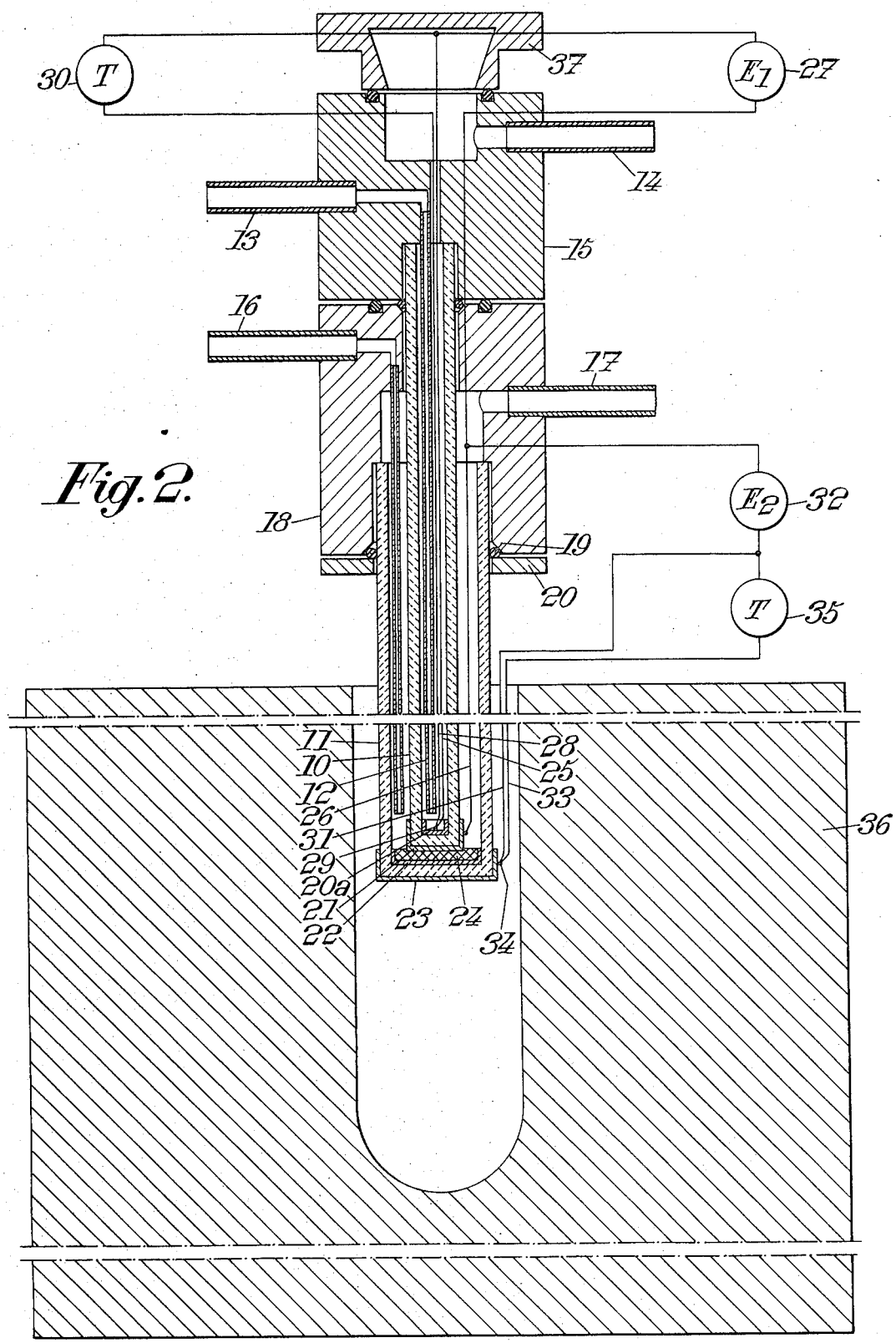

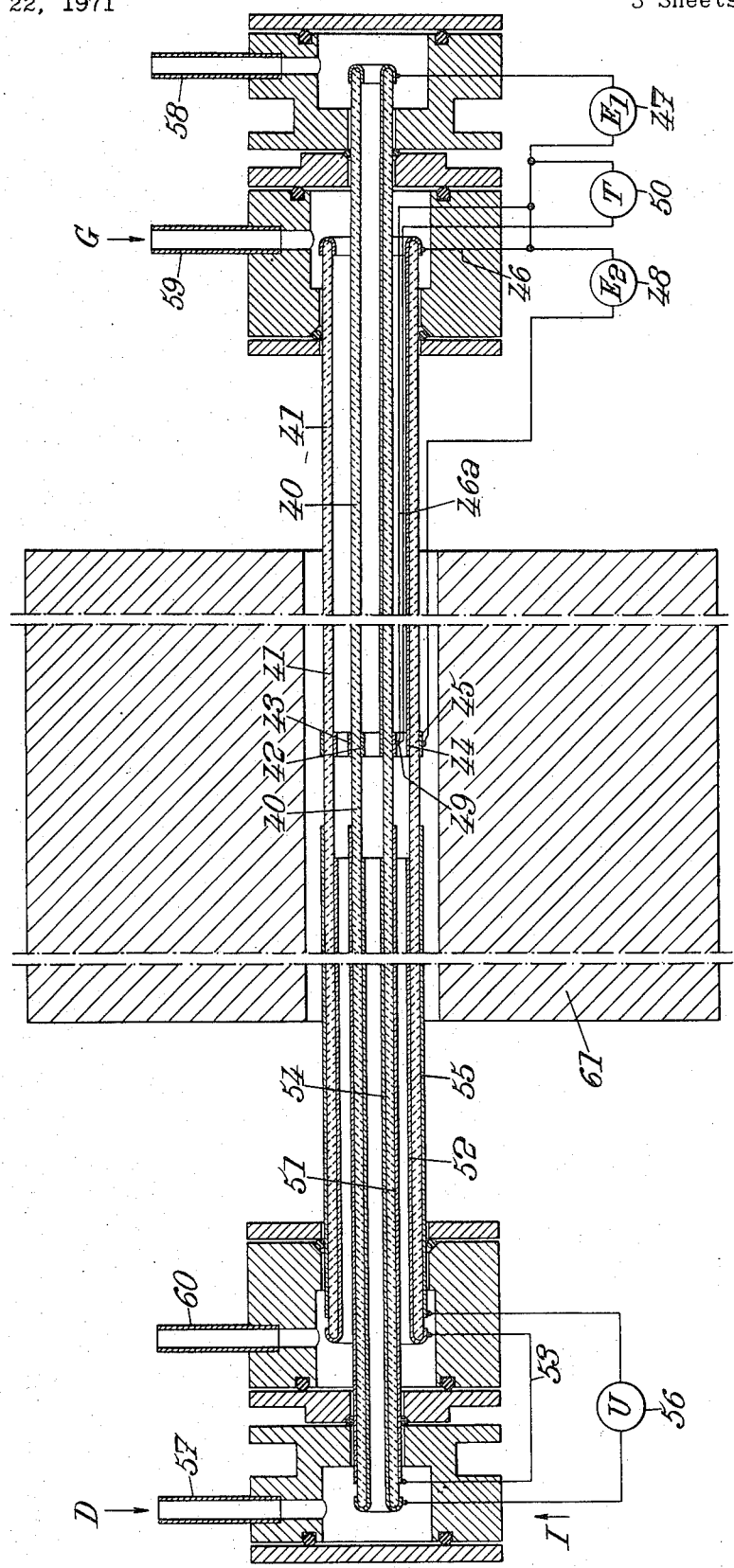

3,791,937
METHOD AND DEVICE FOR REGULATING THE CONTENT IN A GASEOUS MIXTURE OF A GIVEN PURE GAS, ESPECIALLY OXYGEN
Jean Besson, Montfleury, Michael Bonnat, Grenoble, Charles Deportes, Brignoud, and Michel Kleitz, Grenoble, France, assignors to Agence Nationale de Valorisation de la Recherche (Anvar), Paris, France
Filed Oct. 22, 1971, Ser. No. 191,723
Claims priority, application France, Oct. 23, 1970, 7038365
Int. Cl. G01n 27/46
U.S. Cl. 204—1 R                 9 Claims

ABSTRACT OF THE DISCLOSURE

Between the gaseous mixture and the reference atmosphere, here the external atmosphere, there is provided a protecting atmosphere of composition close to that of the gaseous mixture. Use is made of the ionic conductive properties of solid electrolytes. The invention is especially useful for oxygen pumps and gauges and enables interfering leakages due to the physical permeability of the solid electrolyte and its electrochemical semipermeability, to be eliminated.

---

The present invention relates to a method and device for regulating the content in a gaseous mixture of a given pure gas, especially of oxygen.

In French Pat. No. 1,580,819 of Nov. 15, 1967 there is described a method and a device for regulating the content in a gaseous mixture of a given pure gas especially of oxygen, and which consists in supplying with the mixture to be treated concerned, an enclosure of which the walls are constituted by solid electrolyte with anionic conduction, especially when the pure gas is oxygen, by a metallic oxide capable at least from a certain temperature of conducting an electric current in the form of oxygen ions, these walls comprising on at least portions of their opposite surfaces deposits of unoxidizable materials conductors of electrons and there is applied between these deposits a potential difference intended to produce the electric current above-mentioned through the walls above-mentioned in one direction or the other according as it is desired to increase or reduce the oxygen content of the gas to be treated, the enclosure having then, in particular in the latter case, to be bathed in a medium capable of supplying this oxygen to it.

It is an object of the present invention to provide improvements in the method and in the device concerned, which improvements enable especially the ensuring of a perfect sealing between the gaseous mixture and the reference atmosphere.

In the method described in the above-mentioned French patent the gaseous mixture which is denoted by "gas to be treated" and the reference atmosphere are separated by a wall of an ionic conducting material. As a consequence of the physical permeability of this wall and especially of its electrochemical semipermeability, fluid tightness cannot be ensured between these two atmospheres. Under the usual conditions, the resulting leakages are no longer negligible when the content of pure gas, in this instance oxygen, is less than 10 p.p.m. As a result, particularly as regards the use of the method for measuring purposes, an error in the latter and pollution of gas to be metered, occur.

It is a particular object of the present invention to provide improvements in the method and in the devices for the purpose enabling the above-mentioned drawbacks to be overcome.

These improvements in the methods for the regulation or the measurement of the content of a gaseous mixture of a given pure gas, such as oxygen, and applying electrical conduction such as in the form of oxygen ions of a solid electrolyte forming for example the separating wall between the said mixture and a given atmosphere called reference atmosphere, are essentially characterized in that there is provided between the gaseous mixture and the reference atmosphere, a protective atmosphere contained between the said wall and at least one second wall for example similar to the first.

According to another feature of the invention, the device for the application of the method defined above, especially for the measurement of the content in a gaseous mixture of a given pure gas, especially oxygen, comprises two coaxial tubes of solid electrolyte, especially of zirconia, coated on at least portions of their inner and outer surfaces with deposits of electron conducting materials, for example platinum, the mixture being introduced inside the central tube in the neighborhood of the said deposits whilst the said protective gas fills the space comprised between the said tubes, the walls of the said tubes being connected in series to the terminals of a measuring apparatus, means being provided to measure the temperature of the surface of the said deposits, the outer tube bathing in the free atmosphere and being subjected to the action of a furnace.

According to a third feature of the invention, the device for the application of the above-defined process, especially for the measurement and regulation of the content in a gaseous mixture of a given gas especially oxygen, comprises two coaxial tubes of solid electrolyte especially of zirconia, coated with internal and external deposits on one hand in a relatively small zone for the measurement of the oxygen content of the mixture and in a relatively large zone for the adjustment of the said content, the said deposits being connected respectively to a measuring apparatus and a source of current in two assemblies each placing in series the walls bounding the said atmospheres.

Other features and advantages of the invention will emerge from the additional description and accompanying drawings which follow, which description and drawings relate, of course, to purely illustrative and non-limiting examples.

In the drawings:

FIG. 2 is an example of the application of the improvements according to the invention to a pressure gauge; and FIG. 3 is an example of the application of these improvements to an electrochemical pump-pressure gauge assembly.

Figure 1:
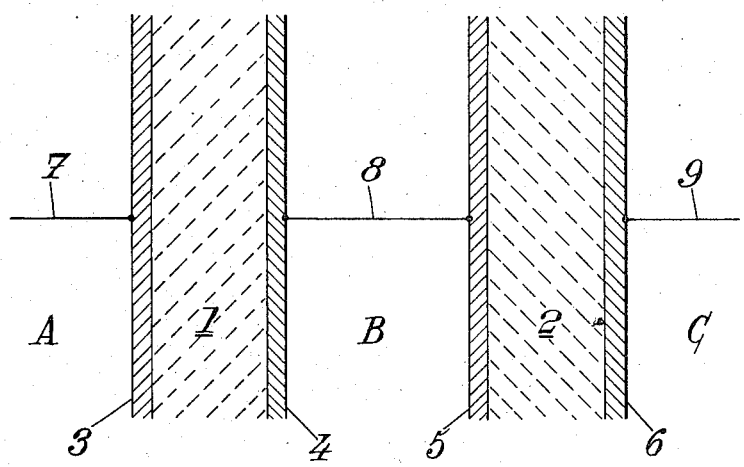
FIG. 1 is a diagrammatic view showing the principle of the improvements according to the invention.

There is shown in FIG. 1, the diagram of the principle of the improvements according to the present invention. The gas to be treated is provided for example in the space A bounded by a wall 1 of an ionic conductive material coated on its two surfaces with an electronic conductive deposit porous to gases. Similarly, the reference atmosphere is arranged in the space C bounded by a wall 2 coated with two deposits of the same properties as the preceding deposits. There is denoted by 3, 4, 5 and 6 in the figure, these various deposits.

According to the invention, a protective atmosphere is arranged in the space B situated between these walls, this atmosphere being possibly constituted especially by a circulating gas. The two assemblies 3, 1, 4 and 5, 2, 6 are connected electrically in series through conductors shown diagrammatically at 7, 8, and 9.

There will now be indicated below, the operation of this assembly in its application to measuring purposes.

The material constituting the wall 1 being an ionic conductor, the electrical potential difference which appears in the open circuit between the conductors 7 and 8 situated in A and B is given by the Nernst relationship:

$$e_{AB} = \frac{RT_1}{z_1 F} \ln \frac{f_D(X)}{f_G(X)}$$

$z_1$ being a constant dependent on the material 1 selected, $T_1$ the absolute temperature of the wall, X denoting the pure gas of which it is desired to know the content of the gas D contained in A or of which it is desired to modify the content of the gas D, $f_D(X)$ and $f_G(X)$ being the fugacity of gas X in the gas D subjected to metering (contained in A) and $f_G(X)$ that of this same gas in the protective atmosphere G, and finally R being the perfect gas constant and F being equal to 1 Faraday.

The potential difference which appears in open circuit between the conductors 8 and 9 of the zones B and C is given by the same relationship:

$$e_{BC} = \frac{RT_2}{z_2 F} \ln \frac{f_G(X)}{f_R(X)}$$

where $T_2$ denotes the absolute temperature of the wall 2, $z_2$ being a constant value dependent on the material 2 constituting this wall, and $f_R(X)$ the fugacity of the gas in the reference gas contained in C.

The assemblies 3, 1, 4 and 5, 2, 6 being connected in series, the potential difference between the conductors 7 and 9 situated at A and C is equal to the sum of the two preceding expressions, namely:

$$e_{AC} = \frac{RT_1}{z_1 F} \ln \frac{f_D(X)}{f_G(X)} + \frac{RT_2}{z_2 F} \ln \frac{f_G(X)}{f_R(X)}$$

If the materials constituting the walls 1 and 2 are assumed identical as well as their respective temperatures, one has, by denoting by z and T, these common values:

$$e_{AC} = \frac{RT}{zF} \ln \frac{f_D(X)}{f_R(X)}$$

The latter formula shows that the protective gas has no influence on the measured voltage. The latter only depends on the reference gas and on the gas to be treated. The measurement of $f_D(X)$ is hence a direct measurement when $F_R(X)$ is known. The millivoltmeter measuring $e_{AC}$ can be graduated directly in F(X) units, that is to say in pressure units for example in mm. of Hg.

It is seen, in the light of the foregoing, that the presence of the protective gas does not bring any complications for the user with respect to the gauges of French Pat. No. 1,580,819. On the other hand, they enable minimizing especially of the interfering leakages of gas X. It suffices for the latter to select the protective atmosphere sufficiently close to the composition of the gas to be analyzed.

It should be noted that in the case where the gas X measured is oxygen, the elimination of the leakages by the method of the invention enables the use under all circumstances of air as reference atmosphere. The choice is particularly interesting, on one hand because this atmosphere is easily available, on the other hand and especially because the fugacity F(X) of oxygen is known with high precision.

There is seen in FIG. 2 an example of the application of the imprevements according to the invention, relating to their use in the measurement of partial pressures of oxygen.

The oxygen gauge thus shown comprises principally two coaxial tubes 10 and 11 corresponding to the walls 1 and 2 in FIG. 1. These tubes are constituted of a conductive solid electrolytic oxide, for example of a solid solution with oxide ion holes, of fluoritic structure and especially of stabilized zirconia. The gas to be analyzed is introduced into the interior of the central tube through a capillary tube 12 opening at the end of the tube 10. There is seen at 13 the inlet tube for this fluid and at 14 the outlet tube, these two tubes being connected to a first cylindrical block 15 inside of which are arranged suitable passages. The same is seen at 16 and 17 for inlet tubes and outlet tubes for the protecting gas. These tubes are connected to a cylindrical block 18 to which the tube 11 is conected.

Sealing is ensured by a toric joint 19 due to the combined action of a flange 20 and of the inclined side of the groove fashioned in the block 18 for the housing of this joint. It should be noted that the various assemblies are shown in diagrammatic manner.

The walls of the tubes 10 and 11 which constitute the active portion of the device comprise a metallic coating on their inner and outer portions. There is seen at 20a and 21 the coatings of the tube 10 and at 22 and 23 those of the tube 11. An electrical connection between the coatings 21 and 22 is ensured by a metallic powder 24.

The surfaces 20a and 21 are connected by means of two conductors 25 and 26 to a millivoltmeter 27 with a high input impedance which measures the potential difference between these two surfaces.

A conductor 28 is associated with a conductor 25 to form at 29 a thermocouple measuring by means of apparatus 30 the temperature of the surface 20a. In the same way, a conductor 31 is connected to the surface 23 to measure by means of a millivoltmeter 32 the potential difference between the surfaces 22 and 23. Another conductor 33 is associated with a conductor 31 to form a thermocouple at 34, which measures the temperature of the surface 23 by means of the apparatus 35. An oven 36, supplied electrically, enables the useful portion of the tubes 10 and 11 to be brought to the desired temperature.

It should be noted that the reference atmosphere is here the free outer atmosphere.

Of course, the device has been shown in rather diagrammatic manner as regards its mechanical and electrical details especially at the level of the two blocks 18 and 15 and of the stopper 37 closing the latter. All these mechanical connections are effected in fluid type manner.

The method according to the invention illustrated by FIG. 1 applies also to the case where the system is used as an electrochemical pump. In this case, the conductors 7 and 9 are connected to a source delivering a current I.

The wall 1 being an ionic electric conductor, the passage of I amperes through this wall involves the passage of $I/zF$ moles of gas X per second through the wall. This quantity of gas is extracted from the working gas and injected into the protecting gas or reversely according to the direction of passage of the electric current. The same amount will pass through the wall 2 since the materials are selected so that z has the same value, the intensity of the current traversing the walls 1 and 2 being identical. The protecting gas hence receives from one wall a quantity $I/zF$ of gas X and loses at the other wall the same amount. All occurs therefore as if pumping of the gas X was effected directly between the gas to be metered and the reference atmosphere.

As regards the selection of the protecting atmosphere, the same remarks as those formulated for the operation of the pressure gauge system, still remain valid.

There is seen in FIG. 3 one embodiment of an electrochemical pump and pressure gauge assembly. There is to be seen at the right, the gauge portion substantially similar to that represented in FIG. 2, and on the left the pump portion. There will again be found on the gauge portion two coaxial tubes 40 and 41 of stabilized zirconia comprising on their active portion metallic coatings 42, 43 and 44, 45 on the inside and outside of these tubes. It is to be noted that the inner coating of the tubes 40 and 41 is extended at least along a generator zone up to the right-hand output orifice so as to ensure in simple manner the outer electrical connection.

On the other hand, the electrical connection between the coatings 43 and 44 is ensured not only by means of metallic powder as previously, but by means of a conductor 46 connected to the end of the coating 44. The potential differences between the different surfaces are measured by means of two millivoltmeters 47 and 48. The temperature of the active zone is measured by means of a thermocouple 49 connected to the measuring apparatus 50.

The left-hand portion of the device relates to the electrochemical pump which is identical in its structure with the gauge portions, excepting that the metallizations are of large surface and extend up to the left-hand end of the tubes. The electrical connection between the intermediate metallic surfaces 51 and 52 is ensured by the conductor 53 whilst a potential difference is applied between the inner and outer surfaces 54 and 55 of the tubes 40 and 41 respectively, and by means of a source 56.

There is seen at 57 and 58 the inlet and outlet tubes for the gas to be treated and at 59 and 60 those of the protecting gas. The reference atmosphere is here again the free outer atmosphere. The useful zones of the gauge and of the pump are heated by means of an oven 61.

As regards the structure of the connections enabling the different gaseous and electrical circuits to the interior and to the exterior of the device, it is similar to that of FIG. 2.

The apparatus which has been constructed used tubes of $ZrO_2$-$Y_2O_3$ electrolyte with 9% mole $Y_2O_3$ provided with platinum coatings. It has enabled measurement in a neutral circulating gas which was argon, partial pressures of oxygen of the order of $10^{-18}$ atm. by the use of a protecting atmosphere constituted by a $CO/CO_2$ mixture of suitable composition.

It should be noted that for the use of the device as a gauge especially that of FIG. 2, it is possible to proceed with a true differential measurement, that is to say elimination completely and in positive manner of the effects of ionic permeability of the conductive wall. It suffices for the latter to make the gas constituting the protective atmosphere circulate and to adjust its composition at any moment by means of an auxiliary electrochemical pump so that it is equal to that of the gas to be analyzed. By this means it is ensured that it is indeed the difference of potential at the terminals of the wall separating these two atmospheres (analyzed gas-protective gas) that is being measured. The latter must then be nil when $f_D(X)$ and $f_G(X)$ have the same value.

Of course the invention is not limited to the embodiments described and shown which are merely given by way of illustrative example.

We claim:

1. In a method of regulating or measuring a pure gas in a gaseous mixture wherein a gas to be anlyzed is separated from a reference atomsphere by a wall comprising a solid electrolyte and wherein electrical conduction is effected between said reference atmosphere and said gaseous mixture for the measurement or regulation of a pure gas in the gaseous mixture, the improvement wherein said wall is provided in two portions, a first portion adjacent said gaseous mixture and a second portion adjacent said reference atmosphere, said first and second wall portions forming a chamber between and isolated from said gaseous mixture and said reference mixture, wherein a protective gaseous atmosphere having a composition close to that of said gaseous mixture and isolated from said reference atmosphere and said gaseous mixture is provided in said chamber thereby minimizing leakage of gas between said reference atmosphere and said gaseous mixture, and wherein said electrical conduction is effected in series between said first and second wall portions.

2. A method according to claim 1 wherein said solid electrolyte is a solid oxygen electrolyte.

3. Method according to claim 1, wherein said pure gas is oxygen.

4. Device for measuring a pure gas in a gaseous mixture comprising a central tube and a coaxial outer tube, said tubes being of solid electrolyte coated on at least portions of their inner and outer surfaces with deposits of electron-conducting materials, means for introducing a gaseous mixture inside the central tube in the neighbourhood of the said deposits, means for filling the space between said tubes with a protective atmosphere, means connecting said portions of said surfaces in series to the terminals of a measuring apparatus, means for measuring the temperature of said portions of said surfaces, the outer tube being adapted for exposure to a reference atmosphere and to the action of an oven, and means for isolating said gaseous mixture, said protective atmosphere, and said reference atmosphere from one another.

5. Device according to claim 4 wherein said solid electrolyte is of zirconia, and said deposits are in a relatively minor area for the measurement of the oxygen content of the mixture and in a major area for the regulation of said content, said deposits being connected respectively to a measuring apparatus and to a source of current in two assemblies placing each in series with said portions of said surfaces bounding said atmospheres.

6. Device according to claim 4, wherein said deposits are of platinum.

7. Device according to claim 4, wherein the deposit of electron-conducting material is coated on a minor area of said surfaces, means connecting said electron conducting material on said minor area to said measuring apparatus.

8. Device according to claim 4, wherein the deposit of electron-conducting material is coated on a major area of said surface, means connecting said electron conducting material on said major area to a source of current in two assemblies placing each in series with said portions of said surfaces bounding said atmosphere.

9. A device for regulation or measurement of a pure gas in a gaseous mixture comprising: a first wall comprising a solid electrolyte and provided on at least a portion of its inner and outer surfaces with an electron-conducting material; a second wall comprising a solid electrolyte and providing on at least a portion of its inner and outer surface an electron-conducting material; a first chamber for isolating said gaseous mixture, a surface of said first wall forming a portion of the wall of said first chamber; a second chamber comprising surfaces of said first and second walls for isolating within said second chamber gaseous protective gaseous atmosphere; means for providing a reference atmosphere adjacent a surface of said second wall remote from said second chamber; means for electrically connecting the electron-conducting portions of said surfaces of said walls in series; and means for measuring the temperature of said electrically conducting portions of said surfaces of said walls.

References Cited
UNITED STATES PATENTS
3,400,054    9/1968    Ruka et al. _____ 204—1
3,650,934    3/1972    Hickham et al. _____ 204—1 T X GERALD L. KAPLAN, Primary Examiner U.S. Cl. X.R.

204—1 T, 195 S